Dec. 16, 1952     C. J. KENNEDY     2,622,145
IDENTIFICATION KEYER

Filed Dec. 5, 1951     3 Sheets-Sheet 1

| LETTER | CODE | PERIOD I | PERIOD II | LETTER | CODE | PERIOD I | PERIOD II |
|---|---|---|---|---|---|---|---|
| A | •— | E • | T — | N | —• | T — | E • |
| B | —••• | N —• | I •• | O | ——— | M —— | T — |
| C | —•—• | N —• | N —• | P | •——• | A •— | N —• |
| D | —•• | T — | I •• | Q | ——•— | M —— | A •— |
| E | • | E • |   | R | •—• | A •— | E • |
| F | ••—• | I •• | N —• | S | ••• | I •• | E • |
| G | ——• | T — | N —• | T | — | T — |   |
| H | •••• | I •• | I •• | U | ••— | I •• | T — |
| I | •• | E • | E • | V | •••— | I •• | A •— |
| J | •——— | A •— | M —— | W | •—— | A •— | T — |
| K | —•— | N —• | T — | X | —••— | N —• | A •— |
| L | •—•• | A •— | I •• | Y | —•—— | N —• | M —— |
| M | —— | T — | T — | Z | ——•• | M —— | I •• |

Fig 1

INVENTOR.
CHARLES J. KENNEDY
BY Marvin Moody
ATTORNEY

Dec. 16, 1952 C. J. KENNEDY 2,622,145
IDENTIFICATION KEYER
Filed Dec. 5, 1951 3 Sheets-Sheet 2
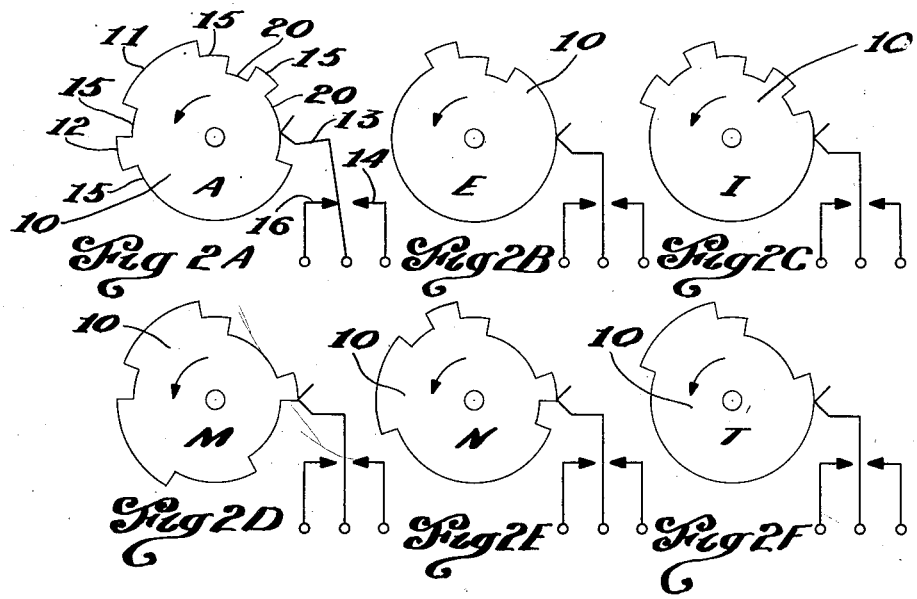
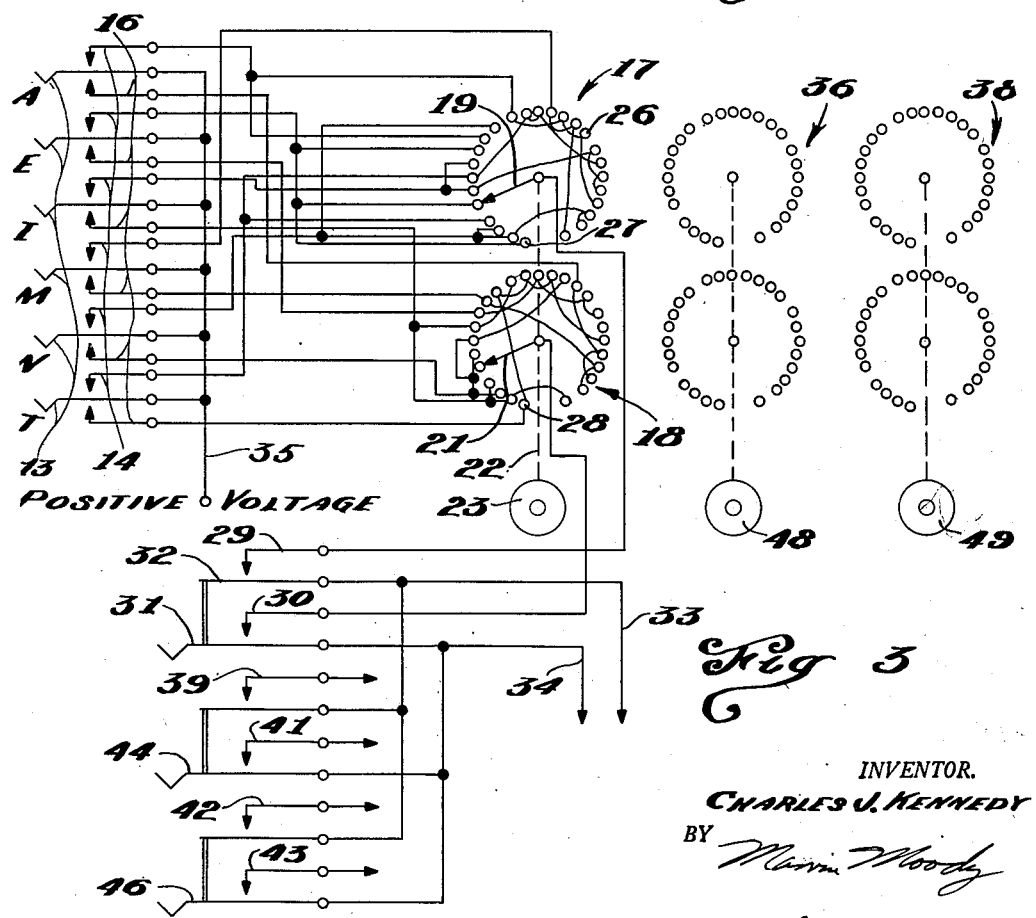
INVENTOR.
CHARLES J. KENNEDY
BY
ATTORNEY Dec. 16, 1952 C. J. KENNEDY 2,622,145
IDENTIFICATION KEYER
Filed Dec. 5, 1951 3 Sheets-Sheet 3
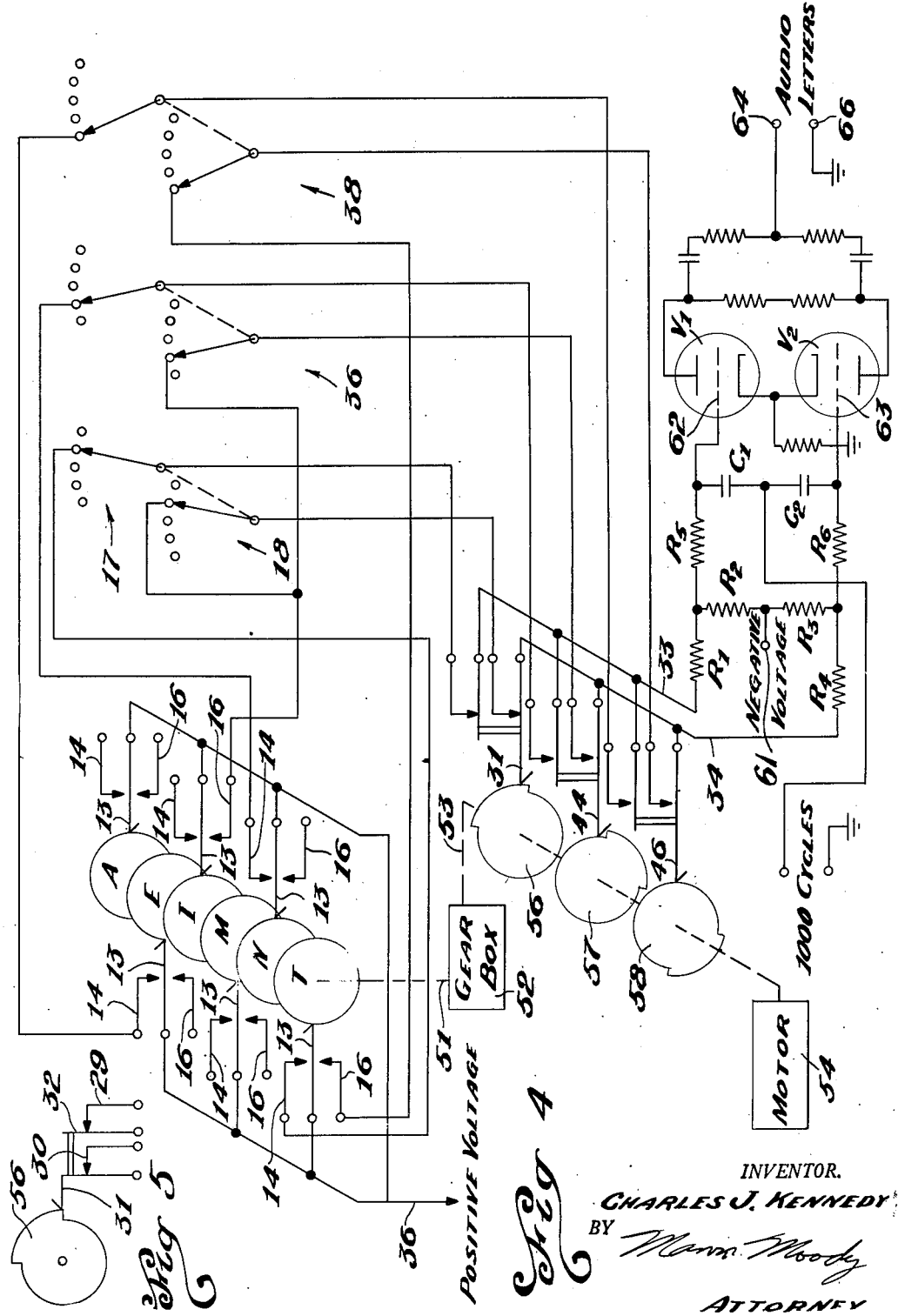
INVENTOR.
CHARLES J. KENNEDY
BY
ATTORNEY Patented Dec. 16, 1952

2,622,145

UNITED STATES PATENT OFFICE 2,622,145

IDENTIFICATION KEYER

Charles J. Kennedy, Oaklyn, N. J., assignor to Collins Radio Company, Cedar Rapids, Iowa, a corporation of Iowa Application December 5, 1951, Serial No. 260,029

7 Claims. (Cl. 177—380)

This invention relates in general to signaling means and in particular to apparatus for simulating ground radio facilities in an aircraft navigation trainer.

Many phases of training for pilots may be made under simulated conditions on the ground, as for example, in Link trainers. Such training is cheaper and safer than when given in the air. Instrument training, under simulated blind flying conditions, may be advantageously given in navigational trainers. Under actual flying conditions one or more radio range stations are tuned in and the pilot makes his navigational computations in response to information received from these stations. Such information might be "A" and "N" code which is periodically interrupted to give the identifying call letters of the radio station. To realistically simulate such a system requires that the student receive periodically the call letters of the transmitting station. It is to be realized, of course, that the present invention may be used to give the call letters of an actual as well as a simulated radio station.

It is an object of this invention therefore to provide apparatus for periodically sending the call letters of a radio station.

Another object of this invention is to provide an improved keying means which uses only six letter cams to simulate the 26 letter alphabet.

Another object of this invention is to provide a transmission system wherein the 26 letters of the alphabet are broken into two parts, each of which may be one of six characters.

Further objects, features and advantages of this invention will become apparent from the following description and claims when read in view of the drawings, in which:

Figure 1 is a chart illustrating the manner in which the alphabet may be broken down into six characters transmitted in combinations of two;

Figure 2–a is a view of the A cam;
Figure 2–b is a view of the E cam;
Figure 2–c is a view of the I cam;
Figure 2–d is a view of the M cam;
Figure 2–e is a view of the N cam;
Figure 2–f is a view of the T cam;

Figure 3 is a wiring diagram illustrating the manner in which the system may be connected;

Figure 4 is a schematic diagram of the system; and,

Figure 5 is a diagram of the selector cams of the invention.

With reference to Figure 1 it is seen that the Morse code for each letter of the alphabet has been broken into two parts. For example, the letter L is seen to comprise a dot, dash, dot, dot which may be broken into a dot, dash and dot, dot. Dot-dash corresponds to the letter A and the dot-dot to the letter I. Thus, if two time units were used the letter L could be transmitted as A in the first unit and I in the second unit. All the letters except E and T have two or more identifying characters and the E and T may be transmitted by sending a dot and dash respectively, in the first period and by leaving the second period blank.

After the breakdown has been made it will be observed that only six letters are needed to make up the entire alphabet when taken in combinations of two. These letters are:

A—dot-dash         M—dash-dash
E—dot              N—dash-dot
I—dot-dot          T—dash Figures 2–a through 2–f illustrate cams 10 which are rotatably supported and have cut in their peripheries notches corresponding to the six required letters. The cam 2–a has a pair of projections 11 and 12 which extend for a substantial distance from the center of the cam. As the cam is rotated in the direction illustrated by the arrow the smaller projection 12 engages a pivoted cam follower 13 which is moved into engagement with a contact 14.

The intermediate portion 15 between the projections 11 and 12 have a radius such that the cam follower 13 does not engage the contact 14 or contact 16 mounted on the other side of the cam follower.

A pair of depressions 20 are formed in the cam and when the cam follower 13 rests on the bottom of these it engages contact 16. Thus it is seen, if the cam A is rotated the cam follower engages contact 14 to transmit the letter during a first time interval, and it would engage contact 16 to transmit the letter A at a subsequent time interval. In a similar manner the cams of Figures 2–b through 2–f are formed so as to have a higher letter transmitting portion corresponding to a first time period and a low letter transmitting portion corresponding to a second period. Each also has an intermediate neutral portion.

Thus, to transmit any of the desired 26 letters the combinations available during the two time intervals may be used.

Figure 3 illustrates the manner in which the cams may be integrated to control the correct transmission of intelligence. A first pair of wafer switches are designated as 17 and 18, respectively. Rotary contacts 19 and 21 respectively, are mounted on a common shaft 22 which may be controlled by a knob 23.

A plurality of contacts 24 and 26 are mounted about the peripheries of the switches 17 and 18 and correspond to the alphabet.

The cam followers 13 are illustrated at the left of the drawing with contacts 14 and 16 shown in their special relationship with the cam followers. Each of the cam followers 13 rests on one of the required six letter cams illustrated in Figures 2-a through 2-f and the contacts 14 are connected to the contacts 24 and contact 16 to contacts 26 so as to obtain the correct combination for transmitting the alphabet.

The switch 17 controls the intelligence during the first period and the switch 18 controls during the second period. If it be assumed that the alphabet is written clockwise on the switches 17 and 18 starting with the gap at the lower portions it will be seen that the contacts 27 and 28 are connected respectively, to the E and T cams. Thus, the letter A will be transmitted when rotary contacts 19 and 21 of switches 17 and 18 are connected to contacts 27 and 28.

A second cam follower 31 is pivotally supported and controls a third pivoted contact 32 which moves with the cam follower 31. A synchronizing cam, not shown in Figure 3, moves the cam follower 31 upwardly so that the members 32 and 31 engage the contacts 29 and 30. A pair of leads 33 and 34, respectively, furnish outputs to a suitable audio system.

The cam followers 13 are mutually connected together electrically and to a lead 36 which may be connected to a positive D. C. voltage. Thus, with the apparatus described electrical impulses corresponding to any of the 26 letters of the alphabet may be obtained between the terminals 33 and 34.

Second and third pairs of wafer switches, designated generally as 36 and 38, correspond to second and third letters which are to be transmitted and it is to be understood that they are wired to contacts 14 and 16 in the same fashion as are the contacts 24 and 26. The pair of switches 36 are connected respectively to contacts 39 and 41 and the switches 38 are connected to contacts 42 and 43. Cam followers 44 and 46, respectively, are controlled by sequencing cams in a manner to be subsequently described so that the letters of the three individual systems will be sent in the correct sequence.

Knobs 48 and 49, respectively, select the letters to be sent by the switches 36 and 38.

Figure 4 illustrates the apparatus shown in Figure 3 with the A through T cams shown mounted on a shaft 51 and the cam followers 13 mounted so as to engage and follow the irregular surface of the cams. A gear box 52 is connected to the shaft 51 and makes a 4 to 1 step-up between an input shaft 53 and shaft 51. The shaft 53 is connected to a driving means, as for example, an electric motor 54. Three sequencing cams 57, 56 and 58 are mounted on the shaft 53. The sequencing cams 56, 57 and 58 are formed with projections that cover approximately ¼ of their circumferences and which are spaced so as to move the cam followers 31, 44 and 46 sequentially.

Figure 5 is a detailed view of the cam followers of the sequencing cams.

The output appearing at terminals 33 and 34 will be the three letters selected by knobs 23, 48 and 49 and in their correct sequence. A blank space corresponding to the first quarter of the sequencing cams prevents any of the cam followers from being actuated.

It is to be noted that direct current actuating voltage has been used and a balancing negative voltage is supplied to terminal 61 between resistors $R_2$ and $R_3$. Resistors $R_1$, $R_5$ and $R_4$, $R_6$ are connected in series in leads 33 and 34. Control grids 62 and 63 respectively, of tubes $V_1$ and $V_2$ receive the inputs from leads 33 and 34. A pair of condensers $C_1$ and $C_2$ are connected between the grids 61 and 62 and a 1000 cycle audio input is supplied to their junction.

The cathodes of the tubes $V_1$ and $V_2$ are connected together and the plates are coupled to an output terminal 64. A second output terminal 66 is connected to ground. The negative voltage applied to contact 61 normally biases the tubes 62 and 63 to cut off so that the 1000 cycle output signal does not reach the output terminals 64 and 66. However, when the cams A through T and sequencing cams 56 through 68 are in the correct position, the positive voltage from leads 33 and 34 bias tubes 62 and 63 to conduction so that they allow an audio signal to pass.

It is to be noted that the tube $V_1$ corresponds to the first period and transmits the first part of the letter whereas the tube $V_2$ corresponds to the second period and allows the second portion of the letter to pass.

The system described allows a three call letter station to be identified but it is to be understood, of course, that the system may be made to operate so that a plurality of stations with a larger or smaller number of call letters may be identified. Suitable sequencing cams and additional switches such as 17, 18, 36 and 38 may be added for this purpose; however, it is believed that the description of a single three letter identifying system discloses the general principles required for the operation of more complicated systems. The fundamental basis of this invention lies in the idea of presenting the 26 letter alphabet with six cams which are taken in sequence two at a time.

Although this invention has been described with respect to particular embodiments thereof, it is not to be so limited as changes and modifications may be made therein which are within the full intended scope of the invention as defined by the appended claims.

I claim:

1. Means for producing Morse code characters corresponding to the alphabet comprising, six letter cams formed with high and low portions about their peripheries corresponding respectively, to the letters A, E, I, M, N and T, six cam followers engageable with the periferies of each letter cam and each movable between a pair of contacts, said cam followers engageable with one of said contacts on the high letter portion of said cam and engageable with the other contacts on the low letter portion of said cam, a pair of wafer switches each having twenty-six stationary contacts about their peripheries, the first of said wafer switches connected to the contacts engaged by the cam followers during the high letter portion of cam travel, the contacts of said second wafer switches connected to the contacts engaged by the cam followers during the low letter portion of cam travel, a wiper contact connected to each of said wafer switches, a shaft connecting said wiper contacts so that they move together, and the output of said first and second wiper contacts producing a letter of the alphabet corresponding to the combination during two time intervals.

2. Means for producing the twenty-six letters of the Morse alphabet comprising, six letter cams corresponding to the letters A, E, I, M, N and T, each of said letter cams cut with high and low portions about their peripheries corresponding to the respective letters, a cam follower attached to each of said letter cams, a pair of switches engageable with each of said cam followers so that the letter cam actuates one switch during a first time interval and the other switch during the second time interval, a pair of selector switches each formed with twenty-six contacts about their peripheries, and the contacts of the first selector switch connected to said first switches, the contacts of the second selector switch connected to the second switches, a pair of wiper contacts engageable respectively with the wafer switches and shafted together, and the electrical output of the wafer contacts corresponding to the complete alphabet formed by combining the six letters during two time intervals.

3. A communication system wherein the twenty-six letters of the Morse code alphabet are changed into combinations of two letters using only letters A, E, I, M, N and T comprising, six letter cams formed with high or low portions corresponding to the Morse letters A, E, I, M, N and T, respectively, six cam followers engageable with the letter cams, a first plurality of switches engageable with the cam followers when they are on the high letter portions of the letter cams, a second plurality of switches engageable with the cam followers when they are on the lower portions of the letter cams, a first wafer switch with twenty-six contacts about its periphery connected to the first group of switches engageable by the cam followers, a second wafer switch with twenty-six contacts about its periphery connected to the second plurality of switches engageable by the cam follower, a pair of wiper contacts engageable respectively with the first and second wafer switches and connected together mechanically so that they move together, and an output means receiving the output from said wiper contacts which corresponds to the twenty-six letters of the Morse alphabet.

4. A communication system for producing the twenty-six letters of the Morse code alphabet in two parts by combining the letters A, E, I, M, N and T comprising, six letter cams formed with high and low portions corresponding to the Morse letters A, E, I, M, N and T, six cam followers engageable with the letter cams, a first plurality of contacts engaged by the cam followers during the first time interval, a second plurality of contacts engaged by the cam followers during the second time interval, a pair of wafer switches each formed with twenty-six contacts about their peripheries corresponding to the twenty-six letters of the alphabet, the twenty-six contacts about the first wafer switch connected to the first plurality of contacts so as to produce the first half of the respective letters, the twenty-six contacts about the second wafer switch connected to the second plurality of contacts so as to obtain the second portion of the letters of the alphabet, a driving means connected to the letter cams, a pair of wiper contacts shafted together and engageable respectively, with the twenty-six contacts about the first and second wafer switches, and the electrical outputs of said wiper contacts connected together so as to produce the letters of the alphabet.

5. Apparatus according to claim 4 wherein a plurality of pairs of wafer switches having twenty-six contacts about their peripheries connected to the first and second contacts adjacent the cam followers, each of said pairs of wafer switches having pairs of wiper contacts shafted together, and the electrical outputs of said wiper contacts connected to sequencing means for producting different Morse letters corresponding to each pair of wiper contacts.

6. Means for producing the Morse alphabet by breaking each character of the alphabet into two portions corresponding to the letters A, E, I, M, N and T, comprising, six letter cams corresponding to said six letters and formed with high and low portions about their peripheries, six cam followers engageable with said letter cams, a first group of six switches adjacent the cam followers and engageable therewith when the cam followers are on the high portion of the letter cams, a second group of six switches adjacent the cam followers and engageable therewith when they are on the low portion of the letter cams, a pair of selector switches each formed with twenty-six contacts about their peripheries corresponding to the twenty-six letters of the alphabet, a pair of wiper contacts shafted together and mounted on the pair of wafer switches, the twenty-six contacts of one of the wafer switches connected to the first group of six contacts so as to produce the first half of the twenty-six letters of the alphabet, the twenty-six contacts of the second wafer switch connected to the second group of six contacts so as to produce the second half of the twenty-six letters of the alphabet, and the electrical outputs of the first and second wiper contacts connected to a detecting means for recognizing the particular letter sent.

7. Apparatus according to claim 6 wherein a plurality of pairs of wafer switches are each formed with twenty-six contacts about their peripheries, a plurality of wiper contacts connected to the pairs of wafer switches with each pair of wiper contacts shafted together, the twenty-six contacts of one of each pair of switches connected to the first group of six contacts, the twenty-six contacts of the second wafer switches connected to the second group of six contacts, and sequencing means receiving the electrical output of said selector switches so that a plurality of letters are produced corresponding to the number of pairs of selector switches.

CHARLES J. KENNEDY.

REFERENCES CITED

The following references are of record in the file of this patent:

UNITED STATES PATENTS

| Number | Name | Date |
| --- | --- | --- |
| 515,110 | Callender | Feb. 20, 1894 |
| 539,701 | Noyes | May 21, 1895 |
| 2,558,718 | Dougherty | July 3, 1951 |